Patented Aug. 9, 1938

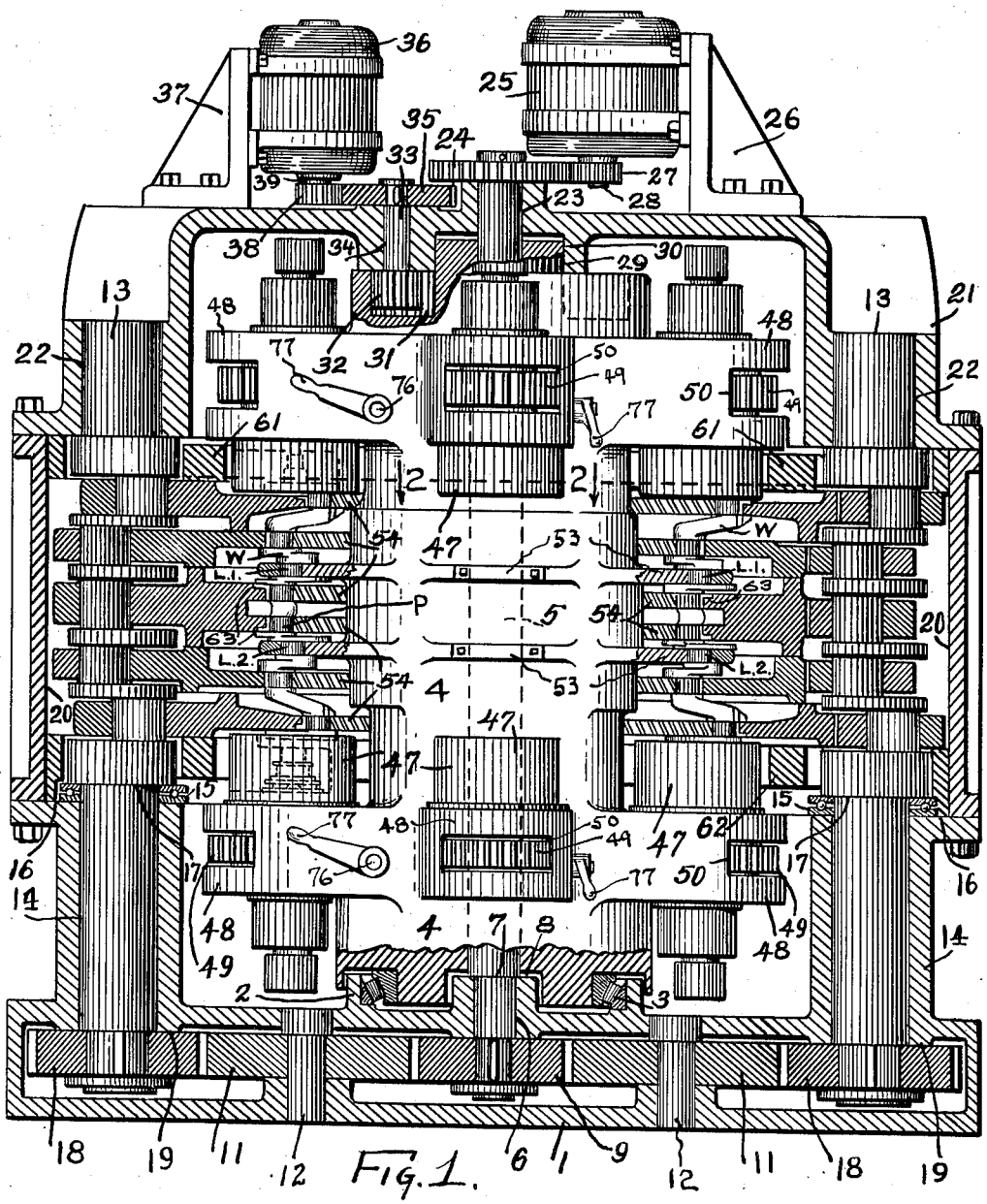

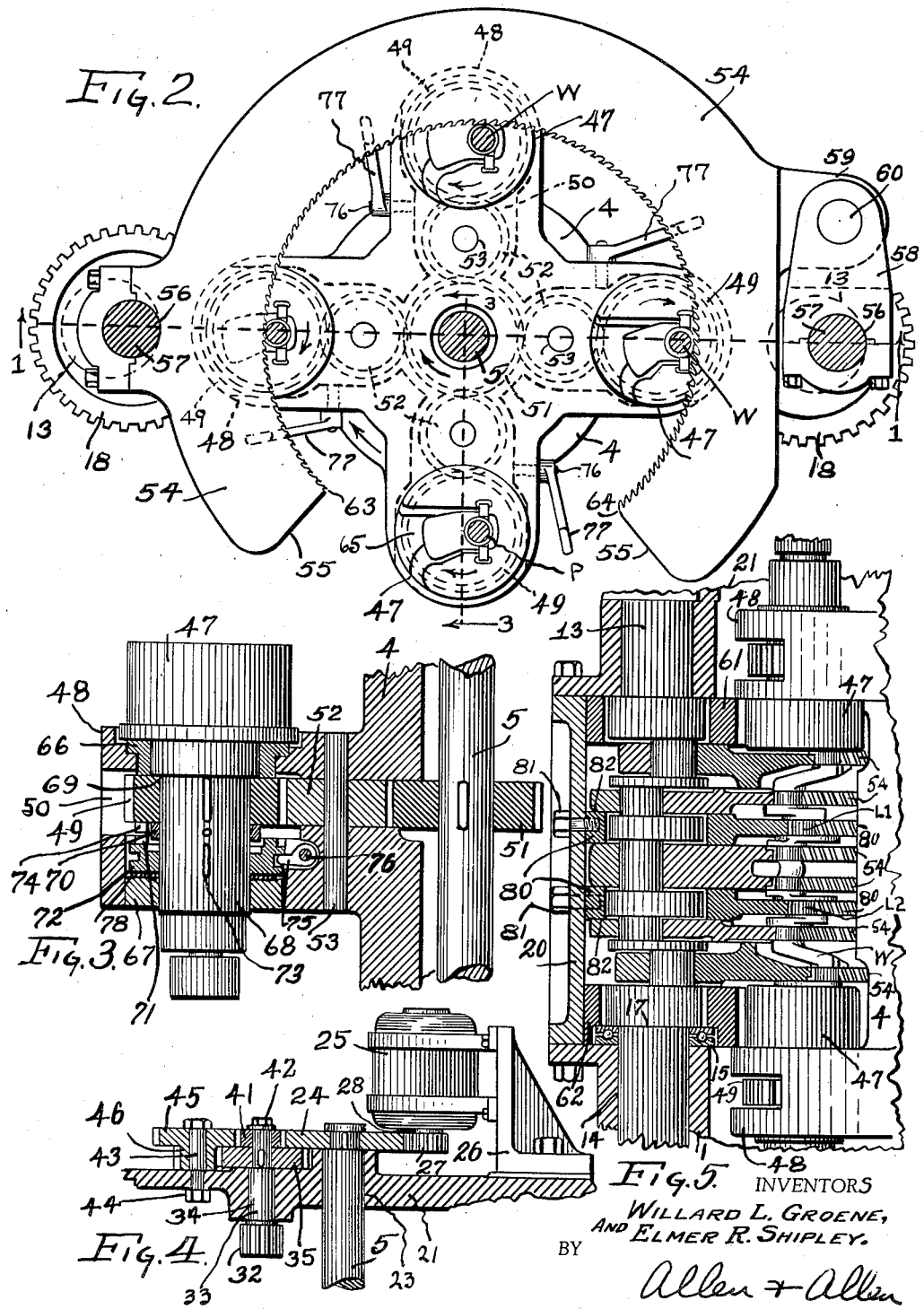

2,126,462

UNITED STATES PATENT OFFICE 2,126,462

ORBITAL BROACHING LATHE

Willard L. Groene, Cincinnati, and Elmer R. Shipley, Hamilton, Ohio, assignors to The R. K. LeBlond Machine Tool Company, Cincinnati, Ohio, a corporation of Delaware Application February 10, 1936, Serial No. 63,104

25 Claims. (Cl. 82—3)

Our invention relates to a method and machine for broaching surfaces of rotating work pieces which are eccentric to the main axes of rotation of the work pieces. It relates further to a method and machine for simultaneously broaching concentric and eccentric surfaces of rotating work pieces.

An object of our invention is to provide one or more rotating work carrying spindles on a revolving table or drum carrier member which member carries the rotating spindles around a circular path in cutting engagement with one or more eccentrically or orbitally moving broaching tools so as to machine a portion of a work piece which is eccentric to the main axis of rotation of the work piece.

Another object of the invention is to provide one or more carrying spindles on a revolving table or drum carrier member which member carries the rotating spindles around a circular path in cutting engagement with one or more fixed broaching tools and one or more eccentrically or orbitally moving broaching tools so as to simultaneously machine both concentric and eccentric portions on the revolving work piece.

Still another object is to provide broaching means capable of machining the radially extended areas associated with the concentric or eccentric portions of the work piece.

A further object of our invention is to provide a pair of master eccentrics or crankshafts which are replicas of the work to be machined, insofar as the eccentricity and indexed positions of the eccentric portions of the work are concerned, which carry the broaching means in proper orbital paths to machine said eccentric portions.

A still further object is to provide means to definitely hold the orbitally moving broaching units from displacement longitudinally of the axis of the work spindles so as to permit proper machining of radially extended faces of the eccentric and concentric portions of a work piece.

Another object of our invention is to provide means for synchronizing the rotation of the work spindles with the means for imparting orbital motion to the broaching tools.

It is another object of our invention to provide means whereby the rotation of the work spindles, the work spindle carrier member, and the means for imparting orbital motion to the broaching tools are all synchronized in a predetermined relationship.

It is a further object of our invention to provide releasable and engageable means for momentarily stopping a work spindle as it passes the loading position of the machine whereby upon reengagement of said means the spindle is again rotated in synchronism and in correct indexed position relative to the means for imparting orbital motion to the broaching tools.

We prefer to use a method of chucking a work piece in the work spindles as disclosed in U. S. Patent No. 1,878,130, reissue application Ser. No. 744,565, and in copending application Ser. No. 756,727, although this is no limitation upon our present invention.

We also prefer to utilize one or more steady rest devices coacting with portions of the work piece which are concentric with the main axis of rotation of the work piece, but also without limitation.

The orbitally moving broaching tools are connected to the eccentrics of master crankshafts in a manner described in Patents 1,744,885 and Re. 18,662.

These and other objects of our invention which will be pointed out hereinafter or which will be apparent to one skilled in the art upon reading these specifications, we accomplish by that certain construction and arrangement of parts, of which we shall now describe an exemplary embodiment. Reference is now made to the drawings forming a part hereof, and in which—

Figure 1 is a front elevation partly in section on the line 1—1 of Fig. 2 of a machine for broaching the line and pin bearings and associated cheeks and fillets of the line and pin bearings of a crankshaft of an internal combustion engine.

Fig. 2 is a horizontal section on the line 2—2 of Fig. 1 showing an orbitally moving broaching tool unit and the gearing which synchronizes the work spindles with the master crankshafts.

Fig. 3 is a vertical section on line 3—3 of Fig. 2 showing the engageable and releasable mechanism for controlling the work spindle rotation during loading and unloading of the work.

Fig. 4 is a section similar to a portion of Fig. 1, showing an alternative construction providing means of connecting the main driving motor of the machine so that the rotation of the work spindles, the work spindle housing and the means for imparting orbital motion to the broaching tools, are all synchronized in a predetermined relationship.

Fig. 5 shows a section on the line 1—1 of Fig. 2 of a machine arranged for broaching both concentric and eccentric surfaces on a rotating work piece.

The machine has a circular base 1, having an upstanding annular ring 2, concentric with the center of the base, carrying a suitable thrust bearing 3, forming the lower pivotal support for the revolving work spindle housing 4. A power shaft 5 is journaled at 6 in the center of the base 1, the vertical position of the shaft being maintained by means of the coaction between the shoulder 7 of the shaft with the upper face 8 of the journal 6, and the coaction of the gear 9, suitably secured to the shaft 5 below the journal 6, with the lower face thereof. Cooperating with the gear 9 are idler gears 11 journaled on the studs 12 fixed in the base 1. Two master crankshafts 13 are carried in vertical bearings 14 located near the periphery of the circular base 1, downward thrust bearings 15 being provided between the upper surface 16 of the base 1 and the shoulder 17 of the master crankshafts 13. Gears 18, secured to the lower ends of the master crankshafts 13, coact against the faces 19 of the base 1 preventing upward movement of the shafts. The gears 18 cooperate with the idler gears 11 and have the same number of teeth as the gear 9 fixed on the power shaft 5 so that the master crankshafts and the power shaft at all times rotate in synchronism.

Secured to the outer edge of the upper surface 16 of the base 1 are upright standards 20, which carry, fixed to their upper ends, the dome-shaped housing 21. The upper ends of the master crankshafts 13 are journaled in the housing 21 in bearings 22. The power shaft 5 passes through the revolving work spindle housing 4, and has its axis coinciding with the axis of the said revolving work spindle housing 4. It has its upper end journaled in a bearing 23 in the dome-shaped top housing 21. The upper end of the shaft 5, projecting beyond the bearing 23, has fixed to it a gear 24. An electric motor 25 secured to a suitable bracket 26, fixed on top of the housing 21, has a pinion 27 on its shaft 28, which cooperates with the gear 24 of the power shaft 5.

An upstanding boss 29, integral with the work spindle housing 4, and concentric with the axis of rotation of the revolving housing, is carried in a bearing 30 provided in the lower surface of the dome-shaped top housing 21. This arrangement serves as an upper steadying bearing for the revolving work spindle housing 4. A ring gear 31 fixed to the upper surface of the revolving work spindle housing 4, and concentric with the axis of rotation of said housing, is driven by means of a pinion 32 carried on a shaft 33, journaled in the dome-shaped top housing 21. The upper end of the shaft 33, projecting beyond the bearing 34, has fixed thereto the gear 35. An electric motor 36, secured to a suitable bracket 37 fixed on top of the housing 21, has a pinion 38 connected to its shaft 39, which cooperates with the gear 35, thus providing a driving means for revolving the work spindle housing 4.

In some cases it may be desirable to have the main driving motor 25 rotate not only the power shaft 5, but also the work spindle housing 4, thereby providing means to synchronize the rotation of the chucks 47, the work spindle housing 4, and the master crankshafts 13 so as to give the desired cutting action for the broaching means 54 upon the work W. This may be accomplished by an arrangement of gearing shown in Fig. 4. On the upper end of the shaft 33 is fixed a gear 35 as already described. On top of this gear is rotatably journaled a smaller gear 41. A lock nut 42 threaded to the extreme upper end of the shaft 40 provides means to hold the gear 41 in operating position, and also locates the shaft 40 with its integral pinion 32 in proper position. A stud 43 suitably secured by a nut 44 to the housing 21 carries a compound gear comprising the gears 45 and 46 rotatably journaled thereon. The gear 45 cooperates with the small gear 41 and the gear 46 cooperates with the gear 35 so as to produce a definite synchronized drive between the power shaft 5 for driving the work spindles, the master crankshafts 13, and the pinion 32 for rotating the work spindle housing 4. By changing the relative sizes of the gears 24, 41, and 45 or 35 and 46, different ratios of synchronization can be obtained as may be required for different pitches of the broach teeth, or for various types of material being worked upon, in accordance with the degree of finish desired on the work.

The revolving work spindle housing 4 carries one or more pairs of chucks 47, the number of pairs depending on the rate of production desired of the machine. The functions and detailed construction of the chucks 47 are completely disclosed in a copending application, Ser. No. 756,727, filed Dec. 10, 1934, so that these chucks will not be described in detail here. Each pair of chucks is carried on a vertical axis parallel with the axis of rotation of the housing 4. Each chuck is journaled in suitable bearings provided in the protruding integral chuck housings 48 of the rotating work spindle housing 4. Gears 49 (Figs. 1, 2 and 3) are secured to the chucks 47 and operate in suitable cavities 50 in the chuck housings 48. Fixed to the main power shaft 5 near either end are two identical gears 51 (Fig. 2), of the same number of teeth as the gears 49 secured to the chucks 47, which cooperate through idler gears 52 carried on studs 53 secured in the rotating work spindle housing 4 in the cavities 50, so that the chucks at all times are rotated in synchronism with the power shaft 5. It can be clearly seen that since the chucks 47 are caused to rotate in synchronism with the power shaft 5 through the gearing 49, 51 and 52, and since the master crankshafts 13 are caused to rotate in synchronism with the same power shaft 5, through the gearing 9, 11 and 18, the chucks and master crankshafts are rotated in synchronism with the shaft 5 and with each other at all times. As the revolving work spindle housing 4 is rotated by the motor 36 through the means described, the index of the chucks and master cranks is kept in perfect parallelism due to the effect produced by the action of the idler gears 52 and 11 for the drives to the chucks and master crankshafts respectively.

For purposes of illustration, we have shown (Figs. 1 and 2) a conventional six-throw four line bearing crankshaft W. Suitable steady rests 53 may be provided for supporting the two intermediate line bearings L1 and L2 during the machining operation, as is usual in orbital machining operations. These steady rest devices are carried by the rotating work spindle housing 4, and have their bearings in exact alignment with the axis of the chucks 47.

A series of orbital broaching units 54 are provided, one for each of the crank pins P to be machined. (In the particular illustration of Fig. 1, the nature of the work W permits combining the two center units for number 3 and 4 crank pins into one unit.) These units 54 are substantially large rings having cut-away portions 55 to facilitate loading and unloading the work into the chucks 47, and having journals 56 carried on the crank pins 57 of the master crankshafts 13. At one end, each of the units 54 is provided with a pivotal connection 58 between the journal 56 and a lug 59 and pin 60, which arrangement prevents binding the units between the pins of the master crankshafts, and the various broaching units 54 are held in sliding horizontal contact with each other by means of suitable upper and lower thrust members 61 and 62 respectively, in a manner disclosed and claimed in Groene and Siekmann Patent Re. 18,662.

The broach teeth of the units 54 are so arranged that they project progressively nearer to the center of the circle described by the axis of the crank pins of the work crank W as the work travels around the circular path of the broach. The broaches may be composed of teeth in sections, to permit ready renewal of less than the whole series of teeth. The teeth may be so arranged as to provide for dwell, or for cutting different portions of the work at different stages in the cycle of operation, by proper proportioning and arranging of broach teeth in different portions of the path of work travel; and by avoiding the strain of the entire cutting actions upon all portions of the work piece, at any one time upon the machine as a whole. The broach teeth may also be arranged on the side faces 63 for purposes of cheeking the radially extended faces associated with the crank pins and line bearings.

The operation of the machine is as follows:

The broaching units 54 are caused to travel in orbital paths following the orbital path of the work crank pins by means of the master crankshafts 13, which are replicas, as to the position of the crank pins, of the finished work crank shaft W. The revolving work spindle housing 4 revolves slowly clockwise (as seen in Fig. 2) carrying the work W in the rotating chucks around the circular path of the broach, the progressively inwardly positioned broach teeth serving to remove the metal and to finish the work as the clockwise motion takes place. As any particular work spindle passes across the cutaway portions 55 of the broaches, as from the points 63 to 64, the spindle is automatically stopped with the entrance 65 to the chucks facing substantially outward from the center of the machine, so that the work W may be removed or inserted horizontally while held in a vertical position. Suitable means are provided whereby the chucks, which have been stopped for unloading and reloading, will re re-engaged in properly indexed driving relation so that the work will properly engage the broaches at 63 as the revolving work spindle housing carries the newly inserted work W into the circular path of the broaches.

For this purpose, and with reference to Fig. 3, each chuck may be journaled in suitable bearings 66 and 67, provided in the integral chuck housing portions 48 of the revolving work spindle housing 4. Gears 49 are loosely journaled on the chuck spindles 68, and are confined between a shoulder 69 of the chuck spindle and a collar 70, suitably fixed to the spindle, so as to prevent axial movement of the gears 49. On the face of the gear 49 we have shown a single tooth clutch 71. A shiftable clutch collar 72 is slidably keyed at 73 to the spindle 68, and carries a similar single tooth clutch 74. A suitable shifting means may comprise the lever 75, carried on a shaft 76 journaled in a portion of the revolving work spindle housing 4 as shown, and actuated by means of a hand lever marked 77, in Figs. 1 and 2. On the face of the clutch collar 72, opposite to the face having the clutch tooth, we fix a suitable composition material 78, which acts as a brake against the inner face of a member 67, which is either fastened to or integral with the chuck housing extension of the revolving work spindle housing 4. This arrangement provides a means for stopping the chucks with their entrances facing substantially radially outward from the center of the machine for loading and unloading the work, as will be clear, and the one tooth clutch arrangement provides a driving connection which can be engaged only in one position. Hence after the stoppage of a clutch at the loading position and reloading thereof, upon re-engagement of the driving means, the clutch will not be driven until it is in proper indexed relationship to the other clutches in the assembly.

In Fig. 5 is shown an arrangement of broaches which adapts the machine to the simultaneous broaching of concentric and eccentric portions of a revolving work piece. This comprises a series of orbital broaching tools 54 actuated by the master crankshafts 13 substantially as already described. In place of the steady rests 53 we utilize a pair of fixed broach means 80 adapted to machine the line bearings of the crankshaft. These broaching tools 80 are appropriately arranged between the various orbital broaching tools 54 and are secured in fixed position to the upright standards 20 by means of suitable bolting means 81. The orbital units 54 adjacent the fixed units 80 operate in sliding contact against them on the faces 82. The eccentric portions of the master crankshafts 13 in no way come in contact with the fixed broaching means 80. By this arrangement it is readily seen that both the line bearings and pin bearings together with their adjacent cheeks and fillets can be machined simultaneously. It can be further noted that if the effective clamping area of the chucks 47 be reduced to a very minimum so as to expose substantially all of the work, practically all turning operations on the work may be completed at one time.

It is to be clearly noted in Fig. 2, that the work spindles and the master crankshafts 13 revolve in the same clockwise direction as the revolving work spindle housing 4, and that the broach teeth here shown face in a direction opposite to the direction of travel of the work around the circular path of the broach. It is also practicable to revolve the work spindles and master crankshafts in the opposite direction to that of the revolving work spindle housing. In such a case the broach teeth will face in the same direction as the travel of the work about the broaches, whereby a very smooth and efficient cutting action is produced upon the work.

It is to be understood that modifications may be made in our invention without departing from the spirit thereof, and that we are not to be limited except as stated in the claims which follow.

Having thus described our invention, what we claim as new and desire to secure by Letters Patent, is:

1. In a broaching lathe for eccentric broaching, broaching means having a series of broach teeth arranged along a circular path of work travel, a work holder, means for moving said work holder in said path of travel and means for rotating said holder so as to rotate work held therein during said travel, and means for moving said broaching means so as to conform the action of the teeth thereof to the eccentricity of said work.

2. In a broaching lathe, the combination of a work holding means, means for simultaneously rotating said work holding means and moving it in a circular path of travel, broaching means arranged substantially in said path of travel so as to act on said work during said movement, said broaching means being cut away in a portion of said path of travel so as to provide a loading and unloading space for the work, and means for moving the broaching means to conform it to an eccentricity of said work.

3. In a broaching lathe, the combination of a series of work holding means, means for simultaneously rotating said work holding means and moving them in a circular path of travel, broaching means arranged substantially in said path of travel so as to act on said work during said movement, said broaching means being cut away in a portion of said path of travel so as to provide a loading and unloading space for the work, means for stopping the rotation of each of said work holding means as it enters said space, means for restarting said rotation as it leaves said space, and means for moving said broach to conform it to an eccentricity of the work.

4. In a broaching lathe, the combination of a series of work holding means, means for rotating said work holding means and for simultaneously moving them in a circular path of travel, broaching means arranged substantially in said path of travel so as to act on said work during said movement, said broaching means being cut away in a portion of said path of travel so as to provide a loading and unloading space for the work, means for stopping the rotation of each of said work holding means as it enters said space, means for restarting said rotation as it leaves said space, means for insuring that said restarted rotation is in synchronism with the rotation of the other work holding means, and means for moving said broach to conform it to an eccentricity of the work.

5. In a broaching lathe for broaching eccentric portions of a work piece, a work holder, broaching means, means for causing relative movement between said broaching means and said work holder, means for rotating said work holder during said relative movement, means for moving said broaching means so as to conform it to an eccentricity of the work, means for synchronizing the means for rotating the work holder with the means for conforming the broaching means to an eccentricity of the work, driving means for said synchronizing means, and driving means independent from the first mentioned driving means for causing relative movement between said broaching means and said work holder.

6. In a broaching lathe for broaching eccentric portions of a work piece, a work holder, broaching means, means for causing relative movement between said broaching means and said work holder, means for rotating said work holder during said relative movement, means to move said broaching means so as to conform it to an eccentricity of the work, means for synchronizing the means for rotating the work holder, the means for conforming the broaching means to an eccentricity of the work, and the means for causing relative movement between said broaching means and said work holder, and driving means for said synchronizing means.

7. In a broaching lathe for broaching eccentric portions on a work piece, a series of work holders, broaching means, means to move said series of work holders relative to said broaching means, means for rotating said series of work holders in synchronism during said relative movement, means for moving said broaching means so as to cause eccentric surfaces to be machined upon a series of work pieces, means for synchronizing the means for rotating said series of work holders with the means for moving said broaching means, and driving means for said synchronizing means.

8. In a broaching lathe for broaching eccentric portions on a work piece, a series of work holders, broaching means, means to move said series of work holders relative to said broaching means, means for rotating said series of work holders in synchronism during said relative movement, means for moving said broaching means so as to cause eccentric surfaces to be machined upon a series of work pieces, means for synchronizing the means for rotating said series of work holders, the means for moving said broaching means, and the means to move said series of work holders relative to said broaching means, and driving means for said synchronizing means.

9. In an orbital broaching lathe, a table, a plurality of work spindles mounted on said table, means for rotating said table so as to carry said work spindles in a circular path, means for rotating work held in said work spindles in synchronism on their own axes so as to move the work at a peripheral speed greater than that of the table, broaching means having cutting teeth arranged in the path of the work carried by the spindles, and means for moving the broaching means in an orbital path so that surfaces eccentric to the axes of the work spindles may be finished by broaching.

10. In an orbital broaching lathe, a table, a plurality of work spindles mounted on said table, means for rotating said table so as to carry said work spindles in a circular path, means for rotating work held in said work spindles in synchronism on their own axes so as to move the work at a peripheral speed greater than that of the table, broaching means having cutting teeth arranged in the path of the work carried by the spindles, and means for moving the broaching means in an orbital path so that surfaces eccentric to the axes of the work spindles, radially extended surfaces, and any surfaces disposed intermediate said surfaces may be machined by broaching.

11. A broaching lathe having, a work holder, broaching means, means for causing relative movement between said broaching means and the work holder, and means for rotating said work holder during said relative movement, said broaching means being adapted to machine concentric and eccentric surfaces simultaneously upon a work piece held in the work holder.

12. In a broaching lathe having a series of work holders, a series of broaching means, means for causing relative movement between said broaching means and said work holders, means for rotating said work holders during said relative movement, and means for moving some of said broaching means in an orbital path in synchronism with the rotation of said work holders, whereby concentric and eccentric surfaces of a work piece may be machined simultaneously.

13. In a broaching lathe having a series of work holders, a series of broaching means, means for causing relative movement between said broaching means and said work holders, means for rotating said work holders during said relative movement, and means for moving some of said broaching means in an orbital path in synchronism with the rotation of said work holders, whereby concentric and eccentric surfaces of a work piece may be machined simultaneously, said broaching means having plural edged teeth, whereby radial surfaces adjacent said concentric and eccentric surfaces may be concurrently machined.

14. An orbital broaching lathe including in combination, means for rotating work pieces at a cutting speed, means for moving said pieces, while rotating, in a circular path, a broach means comprising a plurality of elongated cutting blades arranged at an acute angle across the path of the work pieces, and including a series of blades the edges of which extend into the path of the rotating work in a stepped relation, and a series the edges of which are arranged at an equal radius, said cutting blades being spaced apart a distance based on feed per revolution of the work and the number of such blades, and means for moving said broaching means so as to conform the action of the teeth thereof to the eccentricity of said work.

15. A crank shaft broaching lathe comprising a work holder for holding a crankshaft, broaching means, means for causing relative movement between said broaching means and a crankshaft in the work holder, means for rotating said work holder during said relative movement, a pair of master crankshafts rotatable in synchronism with said work holder and adapted to move the broaching means in synchronism with said work holder so that one or more crank pins and associated cheeks and fillets of a crankshaft held in the work holder may be finished by broaching.

16. A crankshaft broaching lathe comprising a work holder for holding a crankshaft, broaching means, means for causing relative movement between said broaching means and a crankshaft in the work holder, means for rotating said work holder during said relative movement, a pair of master crankshafts rotatable in synchronism with the work holder, said master crankshafts being adapted to move a portion of said broaching means in synchronism with said work holder so that one or more crank pins and associated cheeks and fillets of a crankshaft may be machined, another portion of the broaching means being fixed and thereby adapted to finish the line bearings and other portions of the crankshaft concentric with the main axis of rotation of the work holder and the associated cheeks and fillets thereof, said pin bearings and line bearings being finished simultaneously by broaching.

17. A crankshaft broaching lathe as set forth in claim 15 wherein a series of work holders for holding crankshafts are utilized.

18. A crankshaft broaching lathe as set forth in claim 16 wherein a series of work holders for holding crank shafts are utilized.

19. In a broaching lathe for eccentric broaching, a rotatable work holder, broaching means, means for causing relative movement along said broaching means by work held in the work holder, a pair of master crankshafts rotatable in synchronism with the work holder, for moving said broaching means so as to conform it to an eccentricity of the work, and a linkage connection between the master crankshafts and the broaching means.

20. An orbital broaching lathe having, in combination, a pair of rotatable work holders, broaching means, means in the work holders to locate the work piece in definite axial, indexed, and endwise position therein, clamping means in the work holders for holding the work therein, means for causing relative movement between the work holders and the broaching means, means for rotating the work holders during the relative movement, and means independent of the work piece to move said broaching means orbitally so as to cause eccentric surfaces to be machined upon a work piece in the work holders, and means for driving the last mentioned means and the work holders in synchronism.

21. An orbital broaching lathe having, in combination, a pair of rotatable work holders, broaching means, means in the work holders to locate the work piece in definite axial, indexed, and endwise position therein, clamping means in the work holders for holding the work therein, steady rest means for the work piece intermediate the work holders, means for causing relative movement between the work holders and the broaching means, means for rotating the work holders during the relative movement, and means independent of the work piece to move said broaching means orbitally so as to cause eccentric surfaces to be machined upon a work piece in the work holders, and means for driving the last mentioned means and the work holders in synchronism.

22. A crank shaft broaching lathe having, in combination, a rotatable work holder for holding a crank shaft, broaching means, means for causing relative movement of the crank shaft along the broaching means, means for rotating the work holder during the relative movement, and means to move said broaching means so as to machine a plurality of crank pins on the crank shaft.

23. A crank shaft broaching lathe having, in combination, a rotatable work holder for holding a crank shaft, broaching means, means for causing relative movement of the crank shaft along the broaching means, means for rotating the work holder during the relative movement, and means to move a portion of said broaching means so as to simultaneously machine a plurality of line bearings and crank pins on the crank shaft.

24. In an orbital broaching lathe a plurality of work spindles, means for moving the spindles in an orbital path, means for rotating the spindles on their own axes to carry the work at a peripheral speed greater than the orbital movement of said spindles, broaching means arranged in the path of the work carried by the spindles, and means for moving said broaching means so as to machine eccentric surfaces upon a work piece.

25. A broaching lathe having a work holder, broaching means, means for causing relative movement between said broaching means and the work holder, and means for rotating said work holder during said relative movement, said broaching means comprising a plurality of cutting blades arranged in sequence along the path of the work pieces, and including a series of blades the edges of which extend into the path of the rotating work in a stepped relation, and a series the edges of which are arranged at an equal radius, said broaching means being adapted to machine concentric and eccentric surfaces simultaneously upon a work piece held in the work holder, and then to finish said surfaces.

WILLARD L. GROENE.
ELMER R. SHIPLEY.